US005337790A

United States Patent [19]

Heritier-Best et al.

[11] Patent Number: 5,337,790

[45] Date of Patent: Aug. 16, 1994

[54] ASSEMBLY FOR CONTROLLING AN EXHAUST GAS RECIRCULATION VALVE FOR AN INTERNAL COMBUSTION ENGINE

[75] Inventors: Pierre Heritier-Best, Orbeil; Isabelle Brault, Clermont-Ferrand; Bernard Judelle, Issoire, all of France

[73] Assignee: Sagem Allumage, Paris, France

[21] Appl. No.: 119,533

[22] Filed: Sep. 13, 1993

[30] Foreign Application Priority Data

Sep. 15, 1992 [FR] France ................................ 92 10974

[51] Int. Cl.$^5$ ........................ F02M 25/07; F16K 51/00

[52] U.S. Cl. ................................ 251/129.21; 123/571; 137/907

[58] Field of Search ........................ 123/568, 569, 571; 137/907; 251/129.21

[56] References Cited

U.S. PATENT DOCUMENTS 4,397,289 8/1983 Haka et al. ........................... 123/571
4,399,798 8/1983 Stoltman ............................. 123/571
4,466,416 8/1984 Kawamura ........................... 123/571
4,567,910 2/1986 Slavin et al. .................... 137/907 X
4,598,729 7/1986 Naito et al. ...................... 137/907 X
4,875,499 10/1989 Fox ................................ 137/907 X
5,065,979 11/1991 Detweiler et al. .............. 137/907 X
5,203,312 4/1993 Sato ...................................... 123/571

*Primary Examiner*—Willis R. Wolfe
*Attorney, Agent, or Firm*—Dennison, Meserole, Pollack & Scheiner

[57] ABSTRACT

An assembly for controlling an exhaust gas recirculation valve for an internal combustion engine, including a vacuum regulator with an inlet adapted to be connected to a vacuum source, and a solenoid valve with an inlet connected to the outlet of the vacuum regulator and with an outlet arranged to be connected to the control inlet of the recirculation valve to furnish a vacuum to the control inlet as a function of an electrical control signal of the solenoid valve. The body of the vacuum regulator is formed of a single part with the closure cap of the body of the solenoid valve, and a conduit formed in the part communicates the interior of the body of the vacuum regulator with the interior of the body of the solenoid valve.

18 Claims, 2 Drawing Sheets

ASSEMBLY FOR CONTROLLING AN EXHAUST GAS RECIRCULATION VALVE FOR AN INTERNAL COMBUSTION ENGINE

BACKGROUND OF THE INVENTION

The present invention relates to a control assembly for an exhaust gas recirculation valve for an internal combustion engine, and more particularly such an assembly including a vacuum regulator whose inlet is arranged to be connected to a vacuum source, and a solenoid valve whose inlet is connected to the outlet of the vacuum regulator and whose outlet is arranged to be connected to the control inlet of the recirculation valve in such a way as to furnish this control inlet with a vacuum as a function of an electrical control signal of the solenoid valve.

Assemblies of this kind are already known and are used to control a valve capable of putting the exhaust loop into communication with the inlet loop of an internal combustion engine in order to recycle a more or less major portion of the exhaust gas.

Exhaust gases are in effect inert. Hence the consequence of recycling them to the inlet is, on the one hand, to lower the combustion temperature by absorption of some of the quantity of heat originating from this combustion process and, on the other hand, to lower the rate of burn and hence to increase the duration of combustion.

The result of this is a reduction in the production of toxic gases and a gain in fuel consumption.

Until now, such assemblies have comprised separate elements installed individually and connected to one another.

This meant great bulk and high installation costs.

SUMMARY OF THE INVENTION

The present invention seeks to overcome these disadvantages.

To that end, the subject of the invention is a control assembly of the type described above, characterized in that the body of the vacuum regulator is formed as a unitary member or part with a closure cap of the body of the solenoid valve, wherein a conduit formed in the part causes the interior of the body of the vacuum regulator to communicate with the interior of the body of the solenoid valve.

The assembly thus achieved is especially compact and moreover is much easier to install, since its elements can be preassembled on the part forming the body of the vacuum regulator and the closure cap of the body of the solenoid valve before the latter is installed in one step on the engine it is intended to equip.

The periphery of the end of the conduit towards the solenoid valve preferably forms a first seat for a closure device of the solenoid valve, the outlet of the solenoid valve being connected with the open air or ambient atmosphere when the closure device is pressed against said first seat.

The solenoid valve includes an orifice for connection with the open air facing the end of the conduit, the periphery of said orifice forming a second seat for the closure device, which is disposed between the end of the conduit and the orifice, the outlet of the solenoid valve being put into communication with the vacuum regulator when the closure device is pressed against the second seat.

In a particular embodiment of the invention, the closure device is arranged to be attracted alternatively toward one and the other seat by an electromagnet and elastic recoil means, the electromagnet being supplied by the electrical control signal, the signal being a square signal of substantially constant frequency and with a variable cyclic ratio.

In that case, the higher the cyclic rate, the longer the solenoid valve is open each cycle. Thus more vacuum is introduced into the exhaust gas recirculation valve, which brings about a greater opening of the valve and hence a higher proportion of recycled exhaust gas.

The aforementioned communication conduit between the interior of the body of the vacuum regulator and the interior of the body of the solenoid valve preferably includes an output regulating nozzle.

In a particular embodiment, this conduit is formed by at least two conduit portions discharging into one another and with axes inclined with respect to one another, the first conduit portion discharging into the open air in proximity with the location where it discharges into the second portion, and the nozzle being formed in a stopper located in the first conduit portion at the location where it discharges into the second portion and stops the connection with the open air of the first portion.

The vacuum regulator may furthermore include adjustment means accessible at the level of its inlet orifice.

Likewise, in a particular embodiment of the invention, the body of a container forming a vacuum reserve is embodied in a single piece with the body of the vacuum regulator and the closure cap of the body of the solenoid valve, the inlet of the vacuum regulator discharging into the container, and the container being capable of being connected to the vacuum source.

More particularly, the container may be closed by a lid which has a check valve whose inlet is inside the container and whose outlet is capable of being connected to the vacuum source.

A particular embodiment of the invention will now be described, by way of non-limiting example, in conjunction with the schematic drawings appended.

DESCRIPTION OF PREFERRED EMBODIMENT

Figure 1:
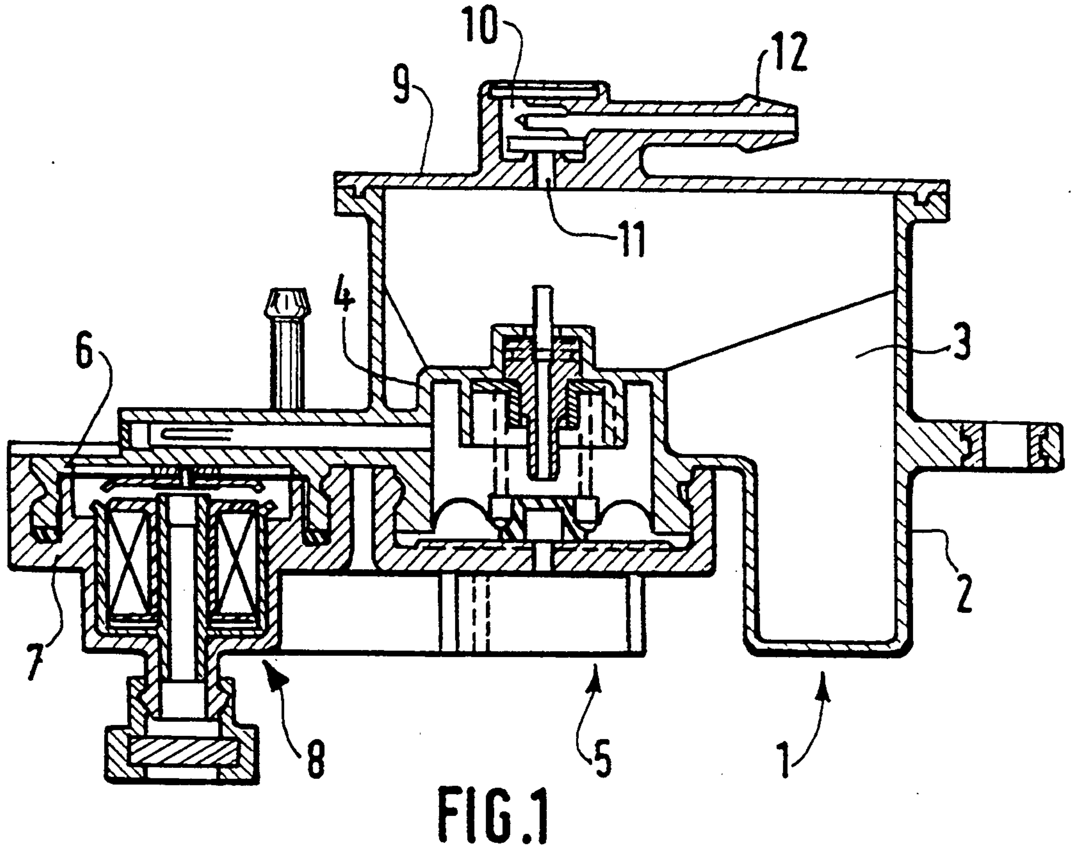
FIG. 1 is a sectional view of an assembly according to the invention.
Figure 3:
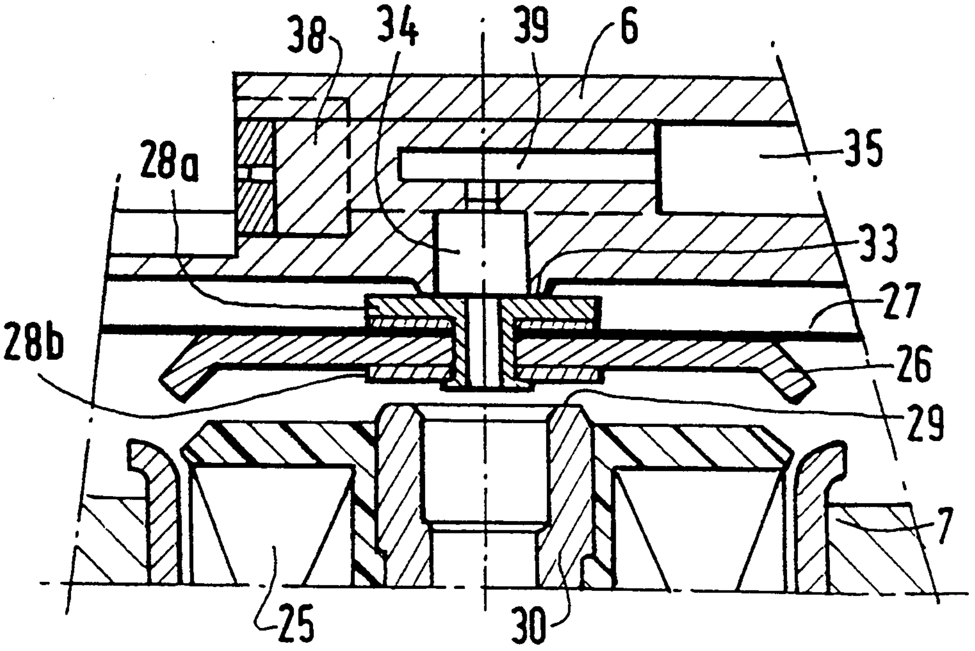
FIG. 3 is a detail view of FIG. 2, on a still larger scale.
Figure 2:
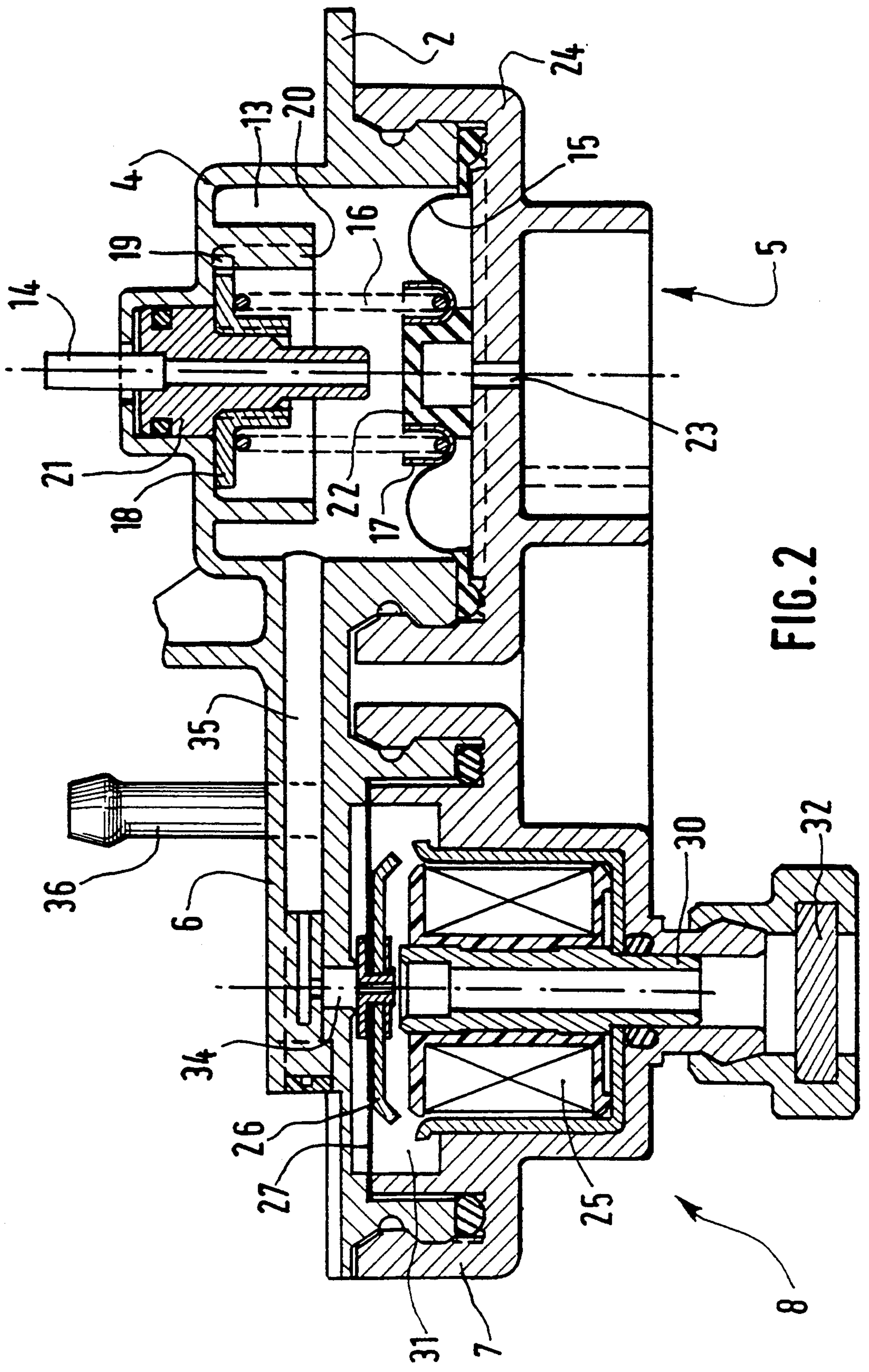
FIG. 2 is a fragmentary view of FIG. 1 on a larger scale.

In the drawings, an integrally cast part 1 can be seen, forming the wall 2 of a container 3, as well as the body 4 of a vacuum regulator 5 and a closure cap 6 for the body 7 of a solenoid valve 8.

The container 3 is closed by a lid 9 that carries a check valve 10. The check valve 10 has an inlet constituted by an orifice 11 formed in the lid 9 and an outlet 12 capable of being connected to a vacuum source, such as the air intake of an internal combustion engine. Consequently, the container 3 forms a vacuum reserve.

The interior 13 of the vacuum regulator 5 is connected to the container 3 via a conduit 14.

This interior 13 is closed by a diaphragm 15 urged by a calibration spring 16 to press, on the one hand, against an annular part 17 for connection with the diaphragm and, on the other, onto a spring collar 18 provided with a guide tongue 19 engaging a groove 20 of the body 4. An adjusting part 21 coaxial with the conduit 14 and the spring 16 has a thread that cooperates with a corresponding thread of the spring collar 18 in such a way that rotating the part 21, caused by any suitable tool, beginning at the interior of the container 3 causes an axial displacement of the spring collar 18 and consequently a more or less major compression of the spring 16, and a regulation of the pressure in the container 3.

The diaphragm 15 also has a closure device 22 for closing an orifice 23 for a connection with the open air, formed in a cap 24 of the vacuum regulator 5.

The solenoid valve 8 includes an electromagnet 25 supplied with a square signal with a variable cyclic ratio and cooperating with an armature 26 carried by a flexible blade that is part of a magnet 27.

The armature 26 has a dual closure device **28*a*, 28*b***.

The device **28*b* is located face to face with a seat 29 formed on the end of a conduit 30 coaxial with the electromagnet 25 and making it possible to connect the interior 31 of the solenoid valve 8 to the open air, by way of a filter 32**.

The closure device **28*a* cooperates with a seat 33 formed around the orifice of a conduit portion 34 formed in the closure cap 6 of the solenoid valve 8. The conduit portion 34 communicates with another conduit portion 35 in such a way as to define a conduit causing the interior 31 of the solenoid valve 8 to communicate with the interior 13 of the vacuum regulator 5. The conduit portions 34 and 35** have their axes perpendicular to one another and located in the same plane.

The conduit portion 35 discharges to the outside of the assembly but is closed at the level where it discharges into the conduit portion 34 via a stopper 38 forming a nozzle 39 for regulating the output between the conduit portions 34 and 35.

The interior 31 of the solenoid valve 8 is also connected to the control inlet of an exhaust gas recirculation valve by way of a conduit 36.

When the electromagnet 25 attracts the armature 26, the device 33 opens the end of the conduit portion 34 and consequently puts the interior 13 of the vacuum regulator into communication with the outlet 36 of the solenoid valve. The pressure regulated by the regulator 5 is consequently applied to the control inlet of the exhaust gas recirculation valve, with the device **28*b* insulating the space 31** from the external pressure.

Conversely, when the closure device **28*a* is pressed against the seat 33, the external pressure is communicated via the conduit 36** to the control inlet of the exhaust gas recirculation valve.

The cyclical ratio of the signal applied to the electromagnet 25 consequently determines the mean pressure applied to the control inlet of the recirculation valve, and therefore the proportion of exhaust gas recycled to the intake.

The control assembly thus achieved is especially compact, with all its elements being supported by the same part 1. Moreover, it is easy to assemble and to install on the engine for which it is intended.

We claim:

1. An assembly for controlling an exhaust gas recirculation valve for an internal combustion engine, including a vacuum regulator (5) with an inlet adapted for connection to a vacuum source, and an outlet, and a solenoid valve (8) with an inlet connected to said outlet of said vacuum regulator and an outlet (36) adapted for connection to a control inlet of the recirculation valve for furnishing a vacuum to said control inlet as a function of an electrical control signal of said solenoid valve; the invention comprising a unitary member forming a body (4) of said vacuum regulator and a closure cap (6) of said solenoid valve, said solenoid valve including a valve body closed by said cap, and a conduit (34, 35) formed in said member communicating the interior of said body of said vacuum regulator with the interior of said body of said solenoid valve.

2. The control assembly of claim 1, wherein said solenoid valve includes a closure device (**28*a*, 28*b*), said conduit at said solenoid valve defining a first seat (33**) for said closure device of said solenoid valve, said outlet of said solenoid valve communicating with the open air when said closure device is seated against said first seat.

3. The control assembly of claim 2, wherein said solenoid valve includes an orifice for communication with the open air, said orifice forming a second seat (29) for said closure device generally opposed to said first seat, said closure device being disposed between said seats, said outlet of said solenoid valve being in communication with said vacuum regulator when said closure device is seated against said second seat.

4. The control assembly of claim 3, in which said closure device is attracted alternatively toward one and the other seat by an electromagnet (25) and elastic recoil means (27), said electromagnet being supplied by said electrical control signal, said signal being a square signal of substantially constant frequency and with a variable cyclic ratio.

5. The control assembly of claim 4, in which said conduit includes an output regulating nozzle (39).

6. The control assembly of claim 5, in which said conduit is formed by at least first and second conduit portions communicating with one another and with axes inclined with respect to one another, said first conduit portion (35) communicating with the open air in proximity with the location where it communicates with said second portion (34), and said nozzle being formed in a stopper (38) located in said first conduit portion at the location where it communicates with said second portion and selectively stops communication between the open air and said first portion.

7. The control assembly of claim 6, in which said vacuum regulator includes adjustment means (21) accessible at its inlet orifice.

8. The control assembly of claim 7, in which said unitary member, forming said body of said vacuum regulator and said closure cap of said solenoid valve, also forms a container (3) forming a vacuum reserve, said inlet (14) of said vacuum regulator discharging into said container, and said container being adapted to communicate with said vacuum source.

9. The control assembly of claim 8, in which said container is closed by a cap (9) with an inlet (11) into said container and an outlet (12) adapted for communication with said vacuum source.

10. The control assembly of claim 1, in which said conduit includes an output regulating nozzle (39).

11. The control assembly of claim 10, in which said conduit is formed by at least first and second conduit portions communicating with one another and with axes inclined with respect to one another, said first conduit portion (35) communicating with the open air in proximity with the location where it communicates with said second portion (34), and said nozzle being formed in a stopper (38) located in said first conduit portion at the location where it communicates with said second portion and selectively stops communication between the open air and said first portion.

12. The control assembly of claim 11, in which said vacuum regulator includes adjustment means (21) accessible at its inlet orifice.

13. The control assembly of claim 12, in which said unitary member, forming said body of said vacuum regulator and said closure cap of said solenoid valve, also forms a container (3) forming a vacuum reserve, said inlet (14) of said vacuum regulator discharging into said container, and said container being adapted to communicate with said vacuum source.

14. The control assembly of claim 13, in which said container is closed by a cap (9) with an inlet (11) into said container and an outlet (12) adapted for communication with said vacuum source.

15. The control assembly of claim 1, in which said vacuum regulator includes adjustment means (21) accessible at its inlet orifice.

16. The control assembly of claim 15, in which said unitary member, forming said body of said vacuum regulator and said closure cap of said solenoid valve, also forms a container (3) forming a vacuum reserve, said inlet (14) of said vacuum regulator discharging into said container, and said container being adapted to communicate with said vacuum source.

17. The control assembly of claim 16, in which said container is closed by a cap (9) with an inlet (11) into said container and an outlet (12) adapted for communication with said vacuum source.

18. The control assembly of claim 1, in which said unitary member, forming said body of said vacuum regulator and said closure cap of said solenoid valve, also forms a container (3) forming a vacuum reserve, said inlet (14) of said vacuum regulator discharging into said container, and said container being adapted to communicate with said vacuum source.

* * * * *